United States Patent
Patel et al.

(10) Patent No.: US 12,356,341 B2
(45) Date of Patent: *Jul. 8, 2025

(54) MAXIMUM POWER REDUCTION BASED ON TRAFFIC PRIORITY

(71) Applicant: T-Mobile USA, Inc., Bellevue, WA (US)

(72) Inventors: Nishant Patel, Irvine, CA (US); Jasinder P. Singh, Olathe, KS (US)

(73) Assignee: T-Mobile USA, Inc., Bellevue, WA (US)

(*) Notice: Subject to any disclaimer, the term of this patent is extended or adjusted under 35 U.S.C. 154(b) by 461 days.

This patent is subject to a terminal disclaimer.

(21) Appl. No.: 17/964,329

(22) Filed: Oct. 12, 2022

(65) Prior Publication Data
US 2023/0033770 A1    Feb. 2, 2023

Related U.S. Application Data

(63) Continuation of application No. 17/357,917, filed on Jun. 24, 2021, now Pat. No. 11,503,553.

(51) Int. Cl.
*H04W 52/36* (2009.01)
*H04L 5/00* (2006.01)
(Continued)

(52) U.S. Cl.
CPC ......... *H04W 52/365* (2013.01); *H04L 5/006* (2013.01); *H04W 28/0268* (2013.01); *H04W 52/281* (2013.01); *H04W 72/56* (2023.01)

(58) Field of Classification Search
CPC ......... H04W 52/365; H04W 28/0268; H04W 52/281; H04W 72/56; H04W 72/543; H04L 5/006; H04L 5/0064
See application file for complete search history.

(56) References Cited

U.S. PATENT DOCUMENTS 6,452,915 B1   9/2002  Jorgensen
8,437,808 B2   5/2013  Kashikar et al.
(Continued)

FOREIGN PATENT DOCUMENTS

EP   3021513 A1   5/2016
JP   5320358 B2   7/2013
(Continued)

OTHER PUBLICATIONS

Taleb, Tarik, et al. "On multi-access edge computing: A survey of the emerging 5G network edge cloud architecture and orchestration." IEEE Communications Surveys & Tutorials 19.3 (2017): 1657-1681. (Year: 2017).*

(Continued)

*Primary Examiner* — Sharad Rampuria
(74) *Attorney, Agent, or Firm* — Perkins Coie LLP

(57) ABSTRACT

The disclosed technology provides a system and method for allocating resource blocks to a mobile device based on a traffic priority of wireless resources between the network and the mobile device. Traffic priority can be determined based on quality of service (QOS) identifiers or network slice identifiers. The highest priority users are allocated inner resource blocks with the lowest allowed maximum power reduction (MPR), the lowest priority users are allocated edge resource blocks with the highest allowed MPR, and the intermediate priority users are allocated outer resource blocks.

18 Claims, 8 Drawing Sheets

(51) Int. Cl.
*H04W 28/02* (2009.01)
*H04W 52/28* (2009.01)
*H04W 72/56* (2023.01)

(56) References Cited

U.S. PATENT DOCUMENTS

| | | |
|---|---|---|
| 8,515,437 B2 | 8/2013 | Okuda |
| 8,811,281 B2 | 8/2014 | Leung et al. |
| 8,825,070 B2 | 9/2014 | Akhtar et al. |
| 8,913,494 B1 | 12/2014 | Marupaduga et al. |
| 9,655,159 B2 | 5/2017 | Paladugu et al. |
| 10,313,919 B2 | 6/2019 | Kang et al. |
| 10,512,064 B1 | 12/2019 | Singh et al. |
| 10,849,025 B1 | 11/2020 | Dong et al. |
| 11,503,553 B1 | 11/2022 | Patel et al. |
| 2004/0203658 A1 | 10/2004 | Narayanan |
| 2013/0058315 A1* | 3/2013 | Feuersanger ....... H04W 52/346 370/336 |
| 2016/0143025 A1 | 5/2016 | Chen et al. |
| 2017/0099673 A1 | 4/2017 | Byun et al. |
| 2017/0295591 A1 | 10/2017 | Nguyen et al. |
| 2018/0132138 A1 | 5/2018 | Senarath et al. |
| 2018/0323947 A1 | 11/2018 | Brunel et al. |
| 2019/0037409 A1 | 1/2019 | Wang et al. |
| 2019/0229967 A1 | 7/2019 | Frank |
| 2019/0288789 A1 | 9/2019 | Li et al. |
| 2020/0146018 A1 | 5/2020 | Yan et al. |
| 2020/0336565 A1 | 10/2020 | Theverapperuma et al. |
| 2021/0045016 A1 | 2/2021 | Dong et al. |
| 2022/0109594 A1 | 4/2022 | Baldemair et al. |
| 2022/0345261 A1* | 10/2022 | Ali ................... H04L 27/2636 |
| 2022/0377681 A1* | 11/2022 | Comsa ................ H04B 17/24 |

FOREIGN PATENT DOCUMENTS

| | | |
|---|---|---|
| JP | 5531115 B2 | 4/2014 |
| JP | 2016502805 A | 1/2016 |
| JP | 6318262 B2 | 4/2018 |
| KR | 20050066632 A | 6/2005 |
| KR | 101159006 B1 | 6/2012 |
| KR | 101227938 B1 | 1/2013 |
| KR | 101583084 B1 | 1/2016 |
| KR | 20160076163 A | 6/2016 |
| KR | 101828886 B1 | 2/2018 |
| WO | 2016105010 A1 | 6/2016 |
| WO | 2017143047 A1 | 8/2017 |
| WO | 2018201822 A1 | 11/2018 |
| WO | 2019178205 A1 | 9/2019 |

OTHER PUBLICATIONS

3GPP TS 38.101-1 v17.1.0; 3rd Generation Partnership Project; Technical Specification Group Radio Access Network; NR; User Equipment (UE) radio transmission and reception (Mar. 2021).

* cited by examiner

MAXIMUM POWER REDUCTION BASED ON TRAFFIC PRIORITY

CROSS-REFERENCE TO RELATED APPLICATIONS

This application is a continuation of U.S. patent application Ser. No. 17/357,917, filed Jun. 24, 2021, entitled MAXIMUM POWER REDUCTION BASED ON TRAFFIC PRIORITY, which is hereby incorporated by reference in its entirety.

BACKGROUND

Power back-off, particularly in a power amplifier (PA) of a mobile communication device, e.g., a cellular user equipment (UE), is a power level below the PA's saturation point at which the PA will continue to operate in the linear region even when the input power level swings. Typically, PAs are configured to operate close to saturation as this is the region of maximum efficiency. However, when operating close to saturation, a small increase in input power can push the PA from the linear region to the saturation region thereby leading to non-linear distortion (e.g., intermodulation distortion (IMD)) that can desensitize the receiver. To ensure that the PA operates in the linear region, the PA's power level can be lowered from the point of maximum efficiency to ensure that it always operates in the linear region despite an increase in the input power of the signal to be amplified. The amount by which the power level is lowered is known as the power back-off or power reduction.

5G NR UEs operate with a choice of two waveforms or access schemes in the uplink (UL). Cyclic Prefix (CP) Orthogonal Frequency Division Multiplexing (OFDM) (CP-OFDM) or Discrete Fourier Transform (DFT)-spread OFDM (DFT-s-OFDM). DFT-s-OFDM is also known as Single Carrier-Frequency Division Multiple Access (SC-FDMA). Despite the advantages of CP-OFDM (e.g., better spectral efficiency), CP-OFDM suffers from higher peak-to-average power ratio (PAPR) than DFT-s-OFDM. Because of the PA nonlinearity, 3GPP allows 5G UEs to reduce the UL transmit power for both the CP-OFDM and DFT-s-OFDM waveforms so that the PA, for example, operates in its linear region thereby avoiding or reducing non-linear distortion (e.g., IMD).

Maximum power reduction (MPR) defines an allowed reduction of maximum power level for certain combinations of modulation used and number of resource blocks assigned. The MPR allows chipset manufacturers to optimize UEs' modulation performance. 3GPP standards define MPR allowed for UEs with different power classes and for different modulation orders and transmit bandwidth configurations. In general, the higher the modulation order, the higher the power reduction allowed; edge and outer resource block (RB) allocations allow for higher power reduction than inner RB allocations; and, CP-OFDM typically allows for a larger power reduction because of the higher PAPR as described above. See, for example, 3GPP TS 38.101-1 v17.1.0 at Tables 6.2.2-1 and 6.2.2-2 for allowed MPR for different power classes, waveforms, modulation mode, and bandwidth. Although MPR allows UEs to avoid non-linear distortion, higher MPR (higher power back-off) can result in lower UL performance and reduced coverage.

BRIEF DESCRIPTION OF THE DRAWINGS

Detailed descriptions of implementations of the present invention will be described and explained using the accompanying drawings.

Figure 1:
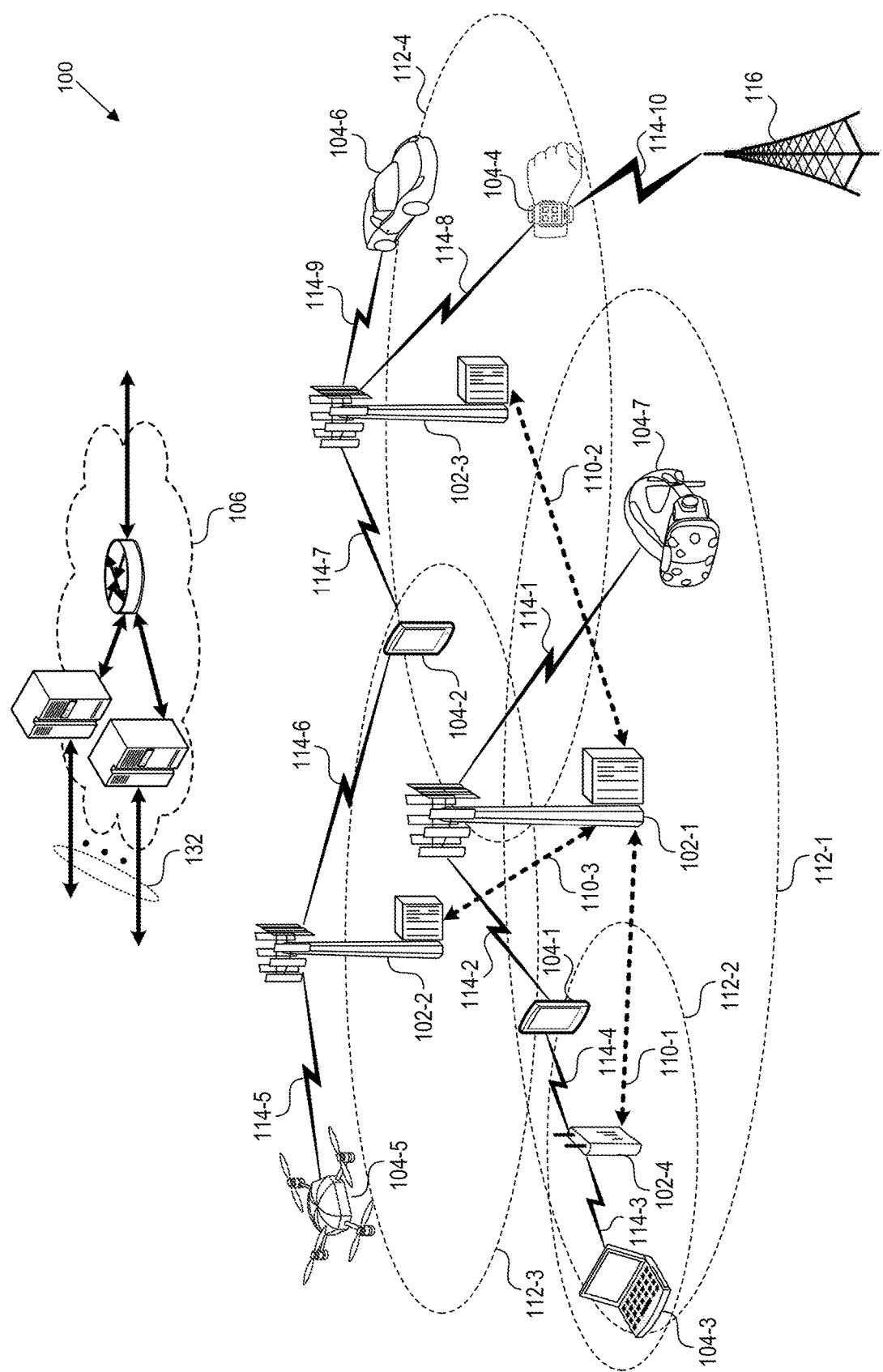
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In one aspect of the disclosed technology, a network node (e.g., an eNB or gNB) determines a priority of traffic to or from a user equipment (UE). The traffic priority can be identified in, for example 5G quality of service (QOS) identifier (5QI) or a 4G QOS class identifier (QCI). The traffic priority can also be identified based on a network slice service type (SST) or a network slice differentiator (SD) value. Depending on the priority of the traffic associated with the UE, the network can allocate Inner, Outer, or Edge resource blocks to the UE. The network allocates inner resource blocks resulting in the lowest allowed maximum power reduction (MPR) for highest priority users (i.e., UEs with highest priority traffic as defined by the 5QI, QCI, SST, or SD values); the network allocates edge resource blocks to the lowest priority users (i.e., UEs with lowest priority traffic); and, the network allocates outer resource blocks to other users (i.e., UEs with intermediate or default priority traffic).

In another aspect of the disclosed technology, the network receives an indication of an emergency call originating from or terminating to the UE. The network allocates the UE with one or more outer or inner resource blocks in response to receive this indication. The network can also send an indication to the UE to utilize a Discrete Fourier Transform (DFT)-spread Orthogonal Frequency Division Multiplex (OFDM) (DFT-s-OFDM) waveform for UL transmissions. This provides for better performance (e.g., better coverage) for the emergency call.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Computer System

Figure 2:
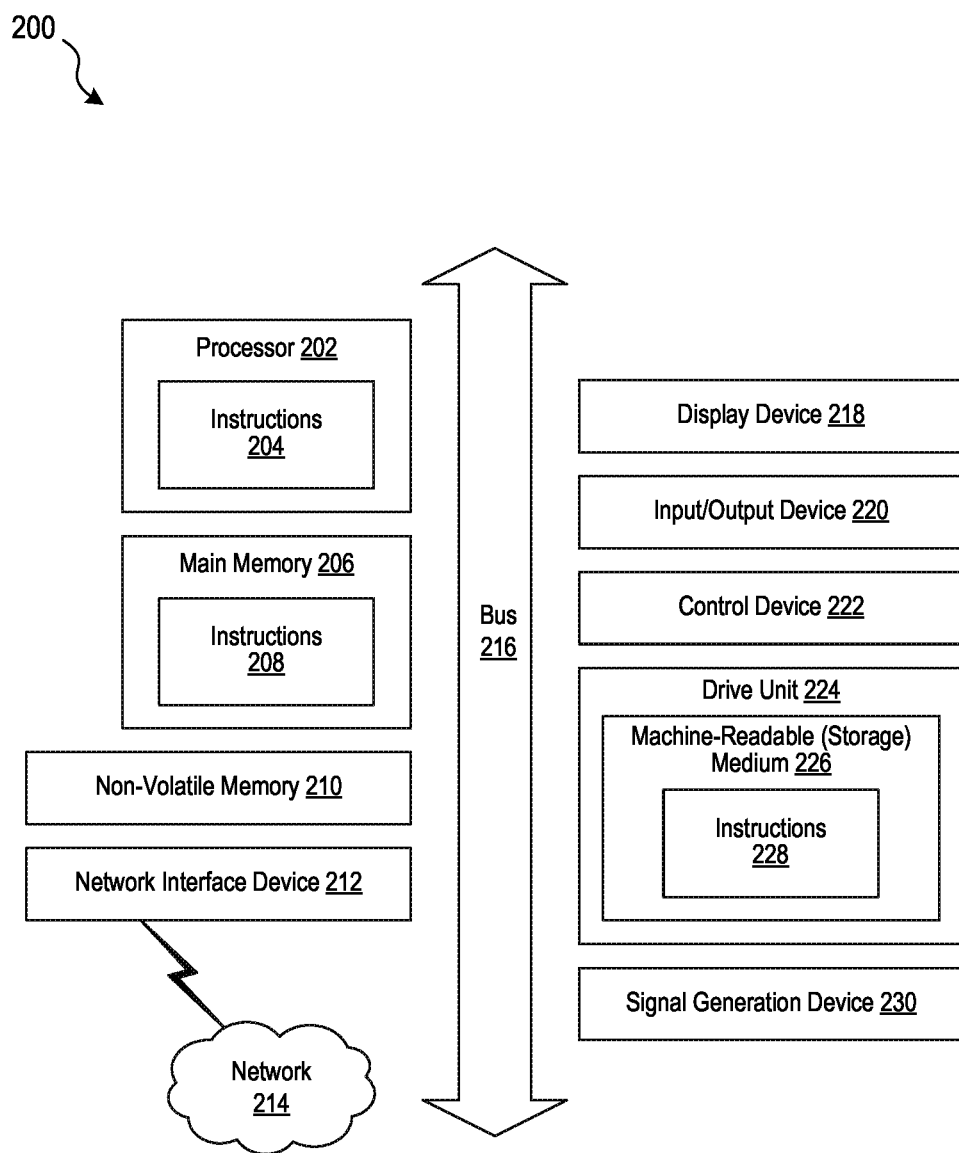
FIG. 2 is a block diagram that illustrates an example of a computer system in which at least some operations described herein can be implemented.

FIG. 2 is a block diagram that illustrates an example of a computer system 200 in which at least some operations described herein can be implemented. As shown, the computer system 200 can include: one or more processors 202, main memory 206, non-volatile memory 210, a network interface device 212, video display device 218, an input/output device 220, a control device 222 (e.g., keyboard and pointing device), a drive unit 224 that includes a storage medium 226, and a signal generation device 230 that are communicatively connected to a bus 216. The bus 216 represents one or more physical buses and/or point-to-point connections that are connected by appropriate bridges, adapters, or controllers. Various common components (e.g., cache memory) are omitted from FIG. 2 for brevity. Instead, the computer system 200 is intended to illustrate a hardware device on which components illustrated or described relative to the examples of the figures and any other components described in this specification can be implemented.

The computer system 200 can take any suitable physical form. For example, the computing system 200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 200. In some implementation, the computer system 200 can be an embedded computer system, a system-on-chip (SOC), a single-board computer system (SBC) or a distributed system such as a mesh of computer systems or include one or more cloud components in one or more networks. Where appropriate, one or more computer systems 200 can perform operations in real-time, near real-time, or in batch mode.

The network interface device 212 enables the computing system 200 to mediate data in a network 214 with an entity that is external to the computing system 200 through any communication protocol supported by the computing system 200 and the external entity. Examples of the network interface device 212 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 206, non-volatile memory 210, machine-readable medium 226) can be local, remote, or distributed. Although shown as a single medium, the machine-readable medium 226 can include multiple media (e.g., a centralized/distributed database and/or associated caches and servers) that store one or more sets of instructions 228. The machine-readable (storage) medium 226 can include any medium that can store, encoding, or carrying a set of instructions for execution by the computing system 200. The machine-readable medium 226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 204, 208, 228) set at various times in various memory and storage devices in computing device(s). When read and executed by the processor 202, the instruction(s) cause the computing system 200 to perform operations to execute elements involving the various aspects of the disclosure.

Priority-Based (QCI/5QI and SST/SD Based) MPR Allocation

Figure 3:
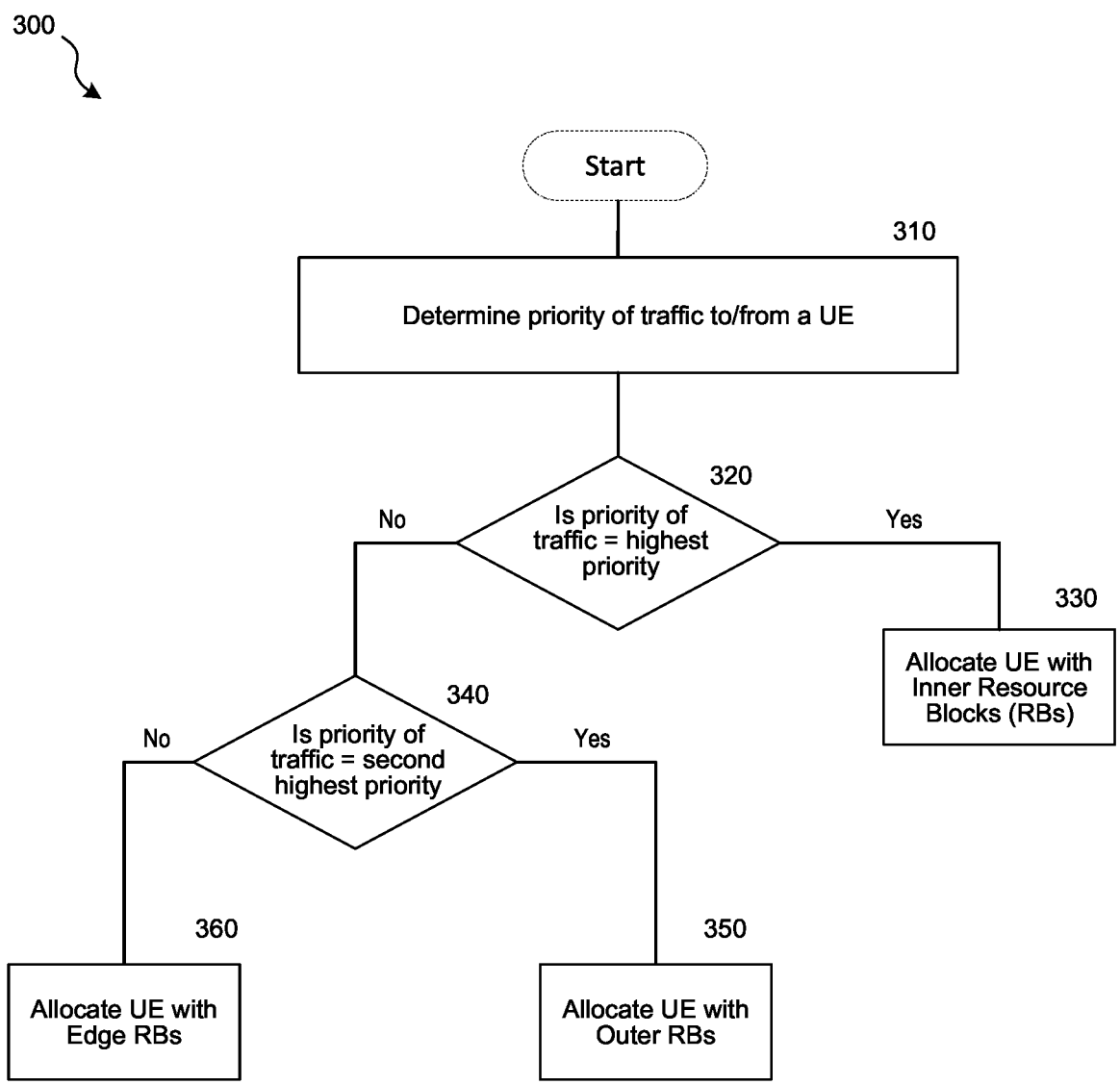
FIG. 3 is flowchart that illustrates allocating resources blocks to a mobile device based on priority of traffic to or from the mobile device.

FIG. 3 is flowchart 300 that illustrates allocating resources blocks to a mobile device based on priority of traffic to or from the mobile device. At block 310, a node in the cellular network, for example, the gNode-B (gNB) in a 5G NR network or the eNode-B (eNB) in a 4G LTE network, determines a priority of traffic originating from or directed to the mobile device or user equipment (UE). As will be discussed below in relation to FIGS. 4 and 5, the priority of traffic could be based on a quality of service (QOS) class identifier (QCI) value for an LTE radio access technology (RAT), or a 5G QoS Identifier (5QI) for an NR RAT. The traffic priority could also be based on a service level agreement (SLA) of a network slice or a priority of certain network capabilities and characteristics represented by a network slice/service type (SST) network slice differentiator (SD) value.

At block 320, the network determines if the traffic priority is the highest traffic priority, i.e., if the traffic priority determined at block 310 is relatively higher than the priority of other traffic on the network. In some implementations, this determination on the relative priority of traffic in the network, and the resulting allocation of resource blocks based on the traffic priority, can be triggered by a determination that a performance of the mobile device is below a pre-determined threshold. For example, the network can determine that there is a network congestion above a certain congestion threshold or a radio frequency (RF) condition that would limit the amount of traffic in the wireless communication network (e.g., limit capacity). In this case, lower priority traffic (e.g., user equipment (UE) traffic with a higher QCI/5QI priority number) can be subject to a lower preferential treatment as will be discussed further below.

At block 330, if the traffic priority is relatively high (e.g., higher than the traffic priority of other traffic to/from other UEs), the network allocates the UE with inner resource blocks. Inner resource block allocation can lead to lower allowed MPR which could help improve the performance of such high priority users on the UEs associated with such high priority traffic. The MPR value is different based on which part (Inner, Outer, or Edge RBs) of the available bandwidth is assigned to the UE for UL transmission (the entire bandwidth is divided among active user per scheduling interval). A lower allowed MPR (e.g., as defined in 3GPP TS 38.101-1, Tables 6.2.2-1 (MPR for power class 3), and 6.2.2-2 (MPR for power class 2)) could lead to lower power back-off from the UE's power amplifier (PA) which could lead to a higher transmit power, more coverage, lower dropped calls, and/or higher data throughput.

If at block 320, the network determines that the traffic priority is not the highest (e.g., not the highest relative to other traffic to other UEs), the network at block 340 can determine if the traffic priority is of an intermediate priority level (e.g., is second highest, i.e., not the highest priority but also not the lowest), or is of the lowest priority level. If the traffic priority is second highest or of an intermediate level, the network at block 350 can allocate outer resource blocks to the UE.

Conversely, if the traffic priority is determined at block 340 to be the lowest (or at least lower than the highest and intermediate priority levels), the network at block 360 allocates edge resource blocks to the UE. Allocation of edge resource blocks results in the highest allowed MPR for certain modulation schemes and UL waveforms thereby allowing for potentially high power back-off which could degrade the UE's performance. Consequently, the lowest priority users (i.e., UEs with lowest priority traffic) can be allocated with edge resource blocks which can lead to the worst UE performance, and intermediate priority users are allocated with outer resource blocks which should result in better UE performance than that of the lowest priority users.

In some implementations, the network can allocate outer resource blocks as described above for all other allocations which are not inner resource block allocations or edge resource block allocations.

In some implementations, the inner/outer/edge resource block allocations can be made without triggering a change in the uplink (UL) waveform or access scheme (between DFT-s-OFDM and CP-OFDM). However, in other implementations, the network can determine what waveform or access scheme to instruct or allow the UE to use based on the traffic priority. For example, high priority traffic (e.g., emergency traffic) can be scheduled to use a DFT-s-OFDM waveform. Assigning the DFT-s-OFDM waveform to high priority UEs has several benefits, for example, (1) a resulting lower allowed MPR for certain RB allocations leading to a lower power back-off and potentially higher transmit power and coverage; and, (2) reducing the probability of deleterious intermodulation distortion (IMD) that would be caused by higher peak-to-average power ratio (PAPR) if the CP-OFDM waveform were used given non-linear components in the UE such as the PA.

Figure 4:
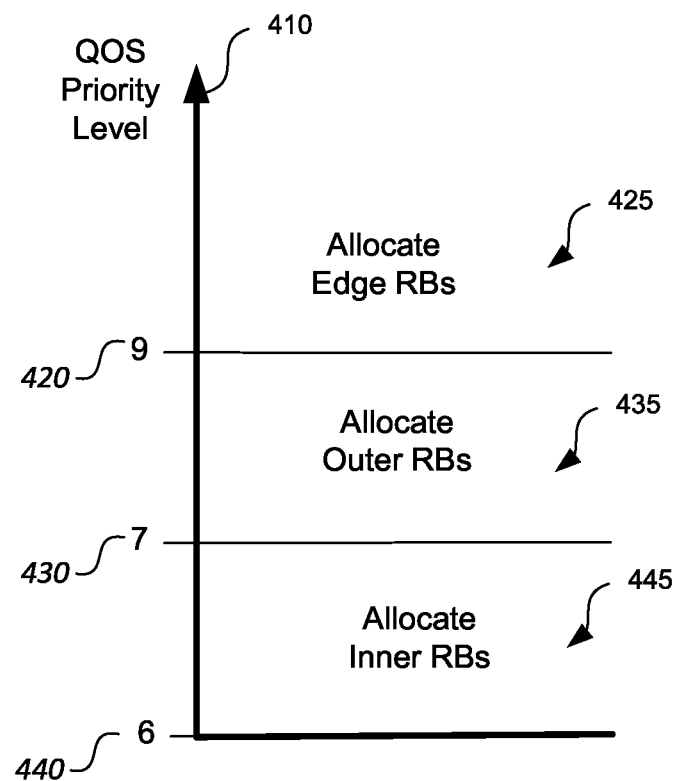
FIG. 4 is a diagram that illustrates allocating resource blocks to a mobile device based on a quality of service (QOS) priority level.

FIG. 4 is a diagram that illustrates allocation of resource blocks to a mobile device based on a quality of service (QOS) priority level 410. For example, for 4G LTE RATs the QOS priority level 410 can be based on a QOS class identifier (QCI); for 5G NR RATs the QOS priority level 410 can be a 5G QOS Identifier (5QI). Cellular operators have different class of best effort users assigned, e.g., from QCI/5QI 6-9. For example, users assigned to non-guaranteed-bitrate (non-GBR) QCI/5QI 6 have higher priority than QCI/5QI 9 users (e.g., QCI/5QI 6 can be assigned to premium or high paying subscribers and QCI/5QI 9 can be assigned to heavy usage users or by as a default). Each QCI/5QI is aligned on the air interface by the eNB/gNB with a data radio bearer, or a flow carried in the bearer.

As depicted in FIG. 4, the network allocates inner resource blocks as shown in section 445 to high priority users (i.e., users with high QOS priority traffic or low QOS priority level 410), e.g., users with traffic with QOS priority level below QOS priority level 430 (e.g., below QCI/5QI=7). For example, users with a QCI/5QI value of 6 or lower who are subscribed to services such as buffered streaming video can be assigned inner resource blocks if the network is congested and others users have higher QOS priority level values (i.e., have lower priority traffic). Guaranteed bitrate (GBR) conversational voice or voice over LTE (VOLTE) users with QCI/5Q1=1 can also be assigned inner RBs.

The network allocates outer resource blocks as shown in section 435 for QOS priority level between QOS priority level 420 (e.g., QCI/5QI=9) and QOS priority level 430 (e.g., QCI/5QI=7). These can be intermediate priority users, e.g., users subscribed on voice services, live streaming video services, interactive gaming services, etc.

The network allocates edge resource blocks to the lowest priority users as shown in section 425. For example, the network allocates edge resource blocks for users with a QOS priority level above 420 (e.g., QCI/5QI value of 9 or QCI/5QI values with a higher priority level than 9). In some implementations, the network allocates edge resource blocks by default to users with QOS priority above a certain level, e.g., to users with a default traffic priority.

Figure 5:
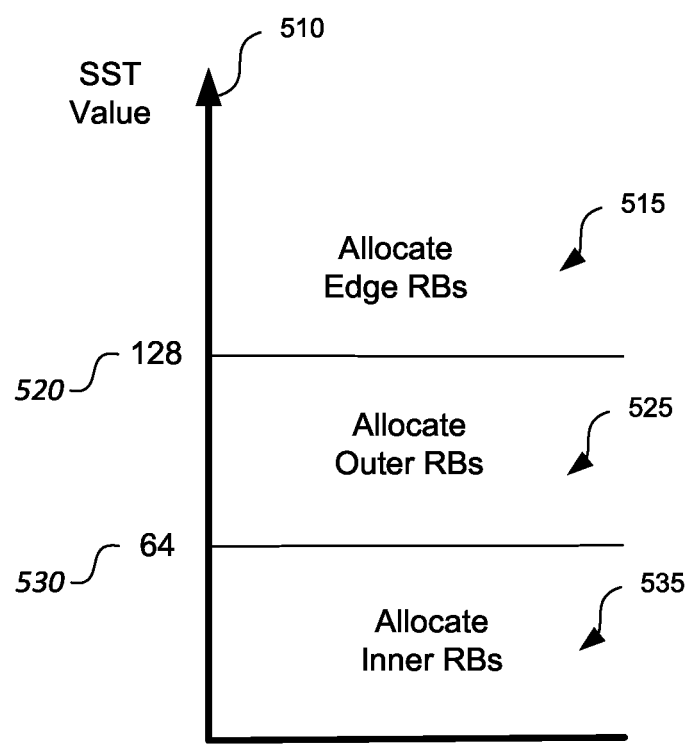
FIG. 5 is a diagram that illustrates allocation of resource blocks to a mobile device based on a network slice priority.

FIG. 5 is a diagram that illustrates allocation of resource blocks to a mobile device or UE based on a network slice priority, for example, a network slice service type (SST) value 510 or network slice differentiator (SD) (not shown in FIG. 5) or other network slice identifier or parameter that defines priority levels over different types of network slices. A Network Slice is a complete logical network including Radio Access Network (RAN) and Core Network (CN). The Network Slice provides telecommunication services and network capabilities, with traffic priorities which may vary (or not) from slice to slice.

The UE can provide Network Slice Selection Assistance Information (NSSAI) parameters to the network to help the network select a RAN and a core network part of a slice instance for the UE. The identification of a Network Slice is done via the Single Network Slice Selection Assistance Information (S-NSSAI). The NSSAI is a collection of S-NSSAIs. The network can also use UE capabilities, subscription information, and local operator policies to do the slice selection. An S-NSSAI is comprised of a Slice/Service type (SST), and an optional Slice Differentiator (SD), which is an optional information that complements the Slice/Service type(s) to differentiate amongst multiple Network Slices of the same Slice/Service type. That is, the SST corresponds to or defines an expected network behavior in terms of features and services (e.g. specialized for broadband or massive IoT), while the SD can help in selecting among several network slice instances of the same type, e.g. to isolate traffic related to different services into different slices. In some implementations, SST values can range from 0-255 where a first range (e.g., 0-127) can be a standardized range and a second range (e.g., 128-255) can be an operator specific range.

A UE can be configured with a certain SST value, and that SST value can be assigned to a specific slice configuration (e.g., UEs can be assigned an SST value of 128 and the SST value of 128 can be assigned to an enhanced mobile broadband (eMBB) slice configuration). Other slice service types can be associated with different types of services or network characteristics, for example, a service type can be associated with massive internet of things (IoT) applications, another service type can be associated with ultra-reliable low latency communication (URLLC) to support autonomous driving, another slice service type can be associated with vehicle-to-everything (V2X) applications, etc.

In some implementations, where a first SST to a first UE is the same as a second SST to a second UE, the S-NSSAI of the first UE can include a slice differentiator (SD) different from the SD in the S-NSSAI of the second UE. The different SDs of the different UEs can be used to select individual network slices of the same type (e.g., different IoT slices) thereby isolating and prioritizing traffic of the individual network slices.

Turning back to FIG. 5, the network can allocate inner resource blocks as shown in section 535 when the SST value is below a certain level (e.g., below an SST value 530 (SST<64)) for slices servicing the highest priority traffic. The network can allocate edge resource blocks when the SST value is above a certain level (e.g., above SST value 520 (SST>128) for slices servicing the lowest priority traffic. Additionally, the network can allocate outer resource blocks for other SST values (e.g., 64≤SST_Value≤128) for slices carrying traffic with intermediate priority. It will be appreciated that these SST values and ranges are merely representative and other values or ranges, or other designations of SST value to SST priority, can be used (e.g., lower SST/SD value representing slices carrying lower priority traffic).

In some implementations, rather than the SST/SD numeric value representing the relative priority of the traffic carried by the corresponding slice, the priority is defined based on the characteristic or the nature of the slice. That is, different SSTs can have different priorities depending on the type of SST. For example, URLLC SSTs or SSTs for providing cloud gaming services requiring sub second latency can be defined to have higher priority than eMBB SSTs; eMBB SSTs can be defined to have a higher priority than IoT SSTs, etc. The highest priority SSTs can then be assigned inner RBs, lowest priority SSTs with edge RBs, and other SSTs (i.e., intermediate priority SSTs) with outer RBs. Inner RBs allow for the lowest MPR thereby providing better performance for the highest priority SSTs vs edge RBs which allow for the highest MPR and potentially lowers performance.

In some implementations, SSTs of the same type (same SST value) can be defined to have different priorities based on their corresponding SDs. For example, an URLLC SST can have different SDs defining slices with different latencies. SDs with lower latency can be ranked at a higher priority than SDs with a higher latency. For eMBB SSTs, SDs with a higher throughput can be ranked with a higher priority than eMBB SDs with a lower throughput. In these implementations, the network can allocate inner RBs to the UEs subscribed to slices with SST/SDs of the highest priority, edge RBs to the UES subscribed to slices with SST/SDs of the lowest priority, and outer RBs to all other UEs.

In some implementations, the network slice priority can be based on slice characteristics similar or identical to the characteristics associated with QCI/5QI values. For example, different SST/SD slice priorities can be based on the scheduling or packet forwarding priority of the corresponding traffic, the packet delay budget, the packet error loss rate (PELR), etc. For example, slices requiring a lower PELR (or UEs associated with QCI/5QI values with lower PELR) can be assigned with inner RBs and those with a higher PELR with edge RBs. In these implementations the slice characteristic can be represented by a network slice identifier. When the network receives the network slice identifier from the mobile device it can determine a priority of the network slice associated with the network slice identifier, e.g., as part of determining if the UE is authorized to use that network slice. If the network determines that the UE is authorized to use that network slice it can allocate it with one or more inner resource blocks if the priority of the network slice associated with the network slice identifier is a highest priority among priorities of network slices of other UEs (or at least higher than the priority of other network slices competing with the UE for the same network resources). If, on the other hand, the network slice associated with the network slice identifier has a lowest priority among the priorities of the network slices of the other UEs (or at least has a lower priority than other network slices for other UEs competing for the same network resources, the network can allocate edge RBs to the UE.

In some implementations, the UE can access multiple network slices simultaneously though a single RAN. For example, the UE can access up to eight slices simultaneously through distinct protocol data unit (PDU) sessions where each PDU session is associated with one slice. In these implementations, the traffic priority of the highest priority network slice (e.g., SST/SD with highest priority) can be used to determine if the UE is to be allocated inner resource blocks or outer/edge resource blocks. Alternatively, each PDU session can be allocated inner/outer/edge resource blocks as described above based on the priority of the slice associated with that PDU session.

In some implementations, the UE can also be configured with different UL waveforms or access schemes based on the network slice priority (e.g., SST/SD value or type). For example, IoT slices can be configured with DFT-s-OFDM because they typically have smaller packets.

Emergency-Calling-Based MPR Allocation

Figure 6:
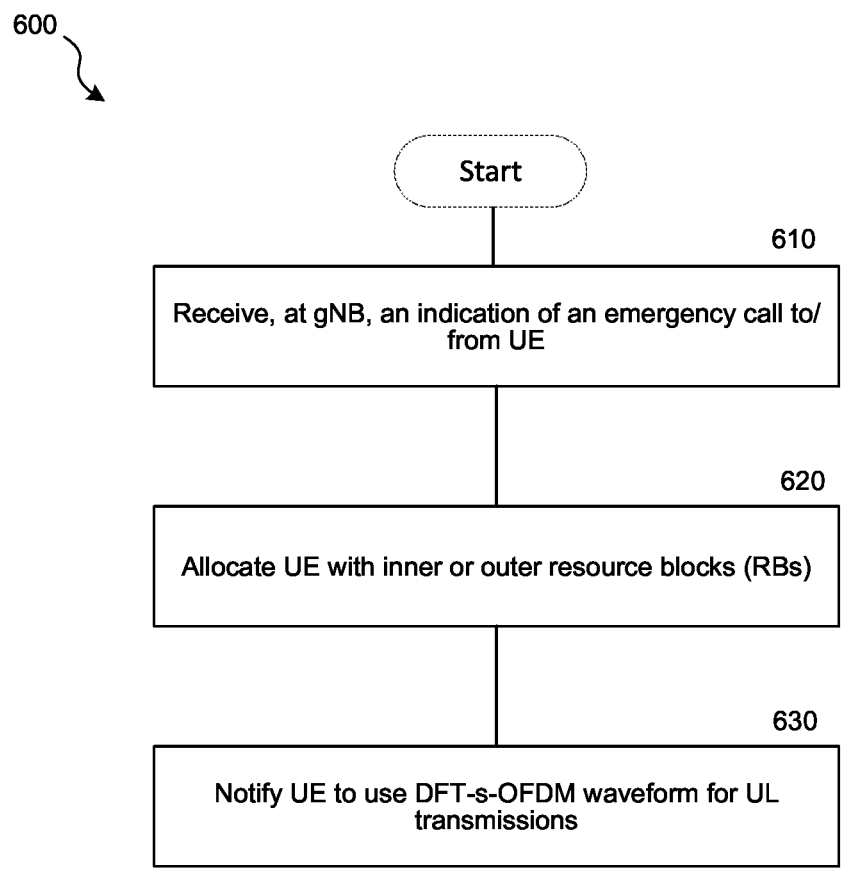
FIG. 6 is flowchart that illustrates allocating resources blocks and access scheme to a mobile device based on receiving an indication of an emergency call.

FIG. 6 is flowchart 600 that illustrates allocating resources blocks and/or UL access scheme to a mobile device or based on whether the UE is requesting or receiving an emergency call. At block 610, the UE receives (e.g., at gNB or other node in the network) an indication of an emergency call towards the UE or originating from the UE. For example, the gNB can identify a flag for an emergency call in a Random Access Channel (RACH) request.

At block 620, the network allocates or configures the UE with inner or outer resource blocks (RBs) which result is a lower allowed MPR and hence better performance (better coverage) than for edge RB allocation.

At block 630, the network can optionally notify the UE or send an indication to configure the UE to use a DFT-s-OFDM waveform or access scheme for UL transmissions irrespective or RF conditions, i.e., even if RF conditions (e.g., signal-to-noise plus interference ratio (SINR)) could allow for use of a CP-OFDM waveform. Configuring UE with inner/outer RBs and DFT-s-OFDM can extend the coverage of the UE providing a better chance that the emergency call will go through uninterrupted.

Power-Headroom-Based MPR Allocation

Figure 7:
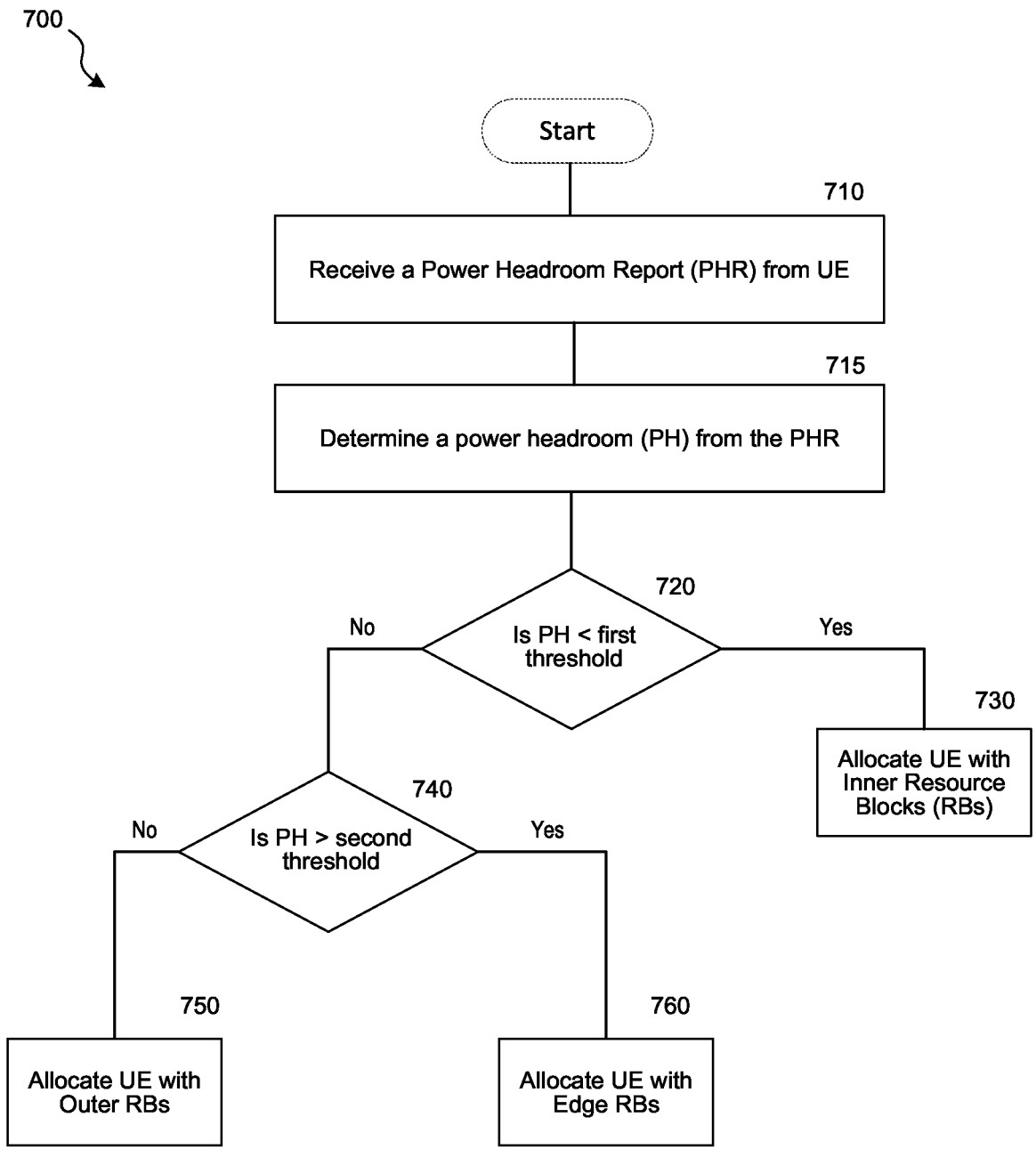
FIG. 7 is flowchart that illustrates allocating resources blocks to a mobile device based on a power headroom of the mobile device.

FIG. 7 is flowchart 700 that illustrates allocating resources blocks to a mobile device based on a power headroom of a mobile device or UE. At block 710, the network (e.g., the eNB or gNB) periodically receives a Power Headroom Report (PHR) from a UE during data transmission. The PHR is a medium access control (MAC) control element reported to the eNB/gNB by UEs.

At block 715, the network determines a power headroom (PH) of the UE. Ordinarily, the network can use the PH to determine how many physical resource blocks to assign to the UE for its transmission in addition to the modulation and coding scheme (MCS) that the UE is to use. That is, the eNB/gNB can use the PHR to determine how much UL bandwidth the UE can use for a specific subframe. If the UE has no power headroom left, there is no need to allocate more resource blocks to the UE because the power headroom indicates how much transmission power is left for the UE to use in addition to the power that the UE is already using for the current transmission (PH=UE maximum transmission power−PUSCH power, where PUSH=Physical Uplink Shared Channel).

At block 720, the network determines if the power headroom (PH) is below a first threshold. Because lower PH typically indicates that the UE is not capable of overcoming interference as well as higher PH, the network allocates the UE, at block 730, with inner resource blocks (RBs) when the PH is low (or for UEs in cell edge). An inner RB allocation is beneficial because it (1) can result in less interference across frequency bands and within the same frequency band for the same transmission time interval (TTI); (2) can result in a lower allowed MPR (lower power back-off) thereby either (i) leading to a higher transmission power (better coverage) or (ii) leading to more power headroom. Additionally, the additional power headroom that results from a lower allowed MPR can allow the network to allocate more RBs to the UE which can improve the UEs performance, for example, by allowing for a reduction in the modulation order or by an increase in the coding rate (both of which can improve coverage).

At block 740, the network determines if the PH is above a second threshold. If it is, the network at block 760 allocates the UE with edge RBs; if the PH is not above the second threshold, the network allocates the UE with outer RBs at block 750. When the UE has a lot of power headroom (e.g., PH above the second threshold), it is better able to handle interference and achieve a wider coverage area and hence the network allocates such UEs with edge RBs which are most prone to interference (because edge RBs are at the lowermost or uppermost edge of the channel). The higher PH allows the eNB/gNB to allocate more RBs and configure the UE with a higher order modulation and lower coding rate. Although the UEs allocated with edge RBs have higher allowed MPR (which could lead to a higher power back-off), these UEs already have additional power headroom and can thus support larger power reduction in the PA without affecting the UEs' performance.

In some implementations with multiple component carriers, e.g., UEs configured for carrier aggregation (CA) or dual-connectivity (DC), the UEs send extended PHRs (ePHR) reports to the network (e.g., to the eNB or gNB). The network determines the RB allocation for each of the component carriers (CC) based on the PH for each of the CC as indicated in the ePHR where the network allocates inner RBs to CCs with the lowest PH and edge RBs to CCs with the highest PH.

Figure 8:
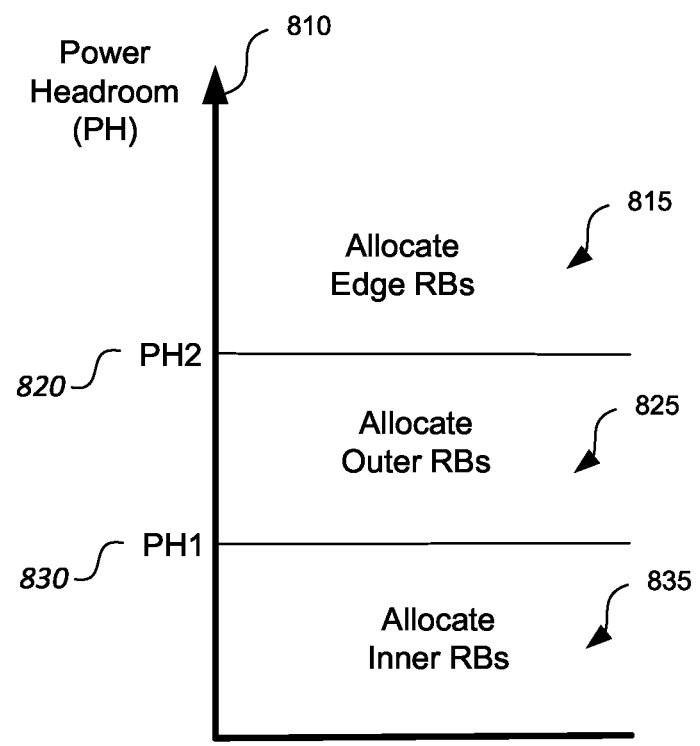
FIG. 8 is a diagram that illustrates allocating of resource blocks to a mobile device based on a power headroom of the mobile device.

FIG. 8 is a diagram that illustrates allocation of resource blocks to a UE based on a power headroom of the UE. For example, the network can determine that the power headroom PH 810 is below a first threshold PH1 830 and thereby allocate inner RBs as shown in section 835. Alternatively, the network can determine that the PH is above a second threshold PH2 820 and allocate edge RBs as shown in section 815. The network can also determine that the PH is between PH1 830 and PH2 820 and allocate outer RBs as shown in section 825.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one non-transitory computer-readable storage medium storing instructions, which when executed by at least one data processor, execute instructions to perform operations in a 5G or later generation wireless network, the 5G or later generation wireless network being caused to:
   determine a priority of traffic to or from a user equipment (UE),
      wherein the priority of traffic is indicated by at least one of a first, or a second resource priority identifier, and
      wherein the first resource priority identifier is associated with a higher priority than the second resource priority identifier;
   allocate the UE with one or more inner resource blocks when the priority of wireless resources is indicated by the first resource priority identifier,
      wherein allocating the one or more inner resource blocks results in a lower maximum power reduction (MPR) for higher priority resource requests; and
   allocate the UE with one or more edge resource blocks when the priority of wireless resources is indicated by the second resource priority identifier,
      wherein the one or more edge resource blocks are allocated to lower priority resource requests relative to the higher priority resource requests.

2. The at least one non-transitory computer-readable medium of claim 1, the 5G or later generation wireless network being further caused to:
   allocate the UE with one or more outer resource blocks when the priority of wireless resources is indicated by a third resource priority identifier, different from the first and the second resource priority identifiers.

3. The at least one non-transitory computer-readable medium of claim 1, the 5G or later generation wireless network being further caused to:
   allocate the UE with one or more outer resource blocks when UE is not allocated with the one or more inner resource blocks and the UE is not allocated with the one or more edge resource blocks.

4. The at least one non-transitory computer-readable medium of claim 1, wherein the priority of wireless resources to or from the UE is indicated by at least one of a 5G quality of service (QOS) identifier (5QI) or a 4G QOS class identifier (QCI).

5. The at least one non-transitory computer-readable medium of claim 1, wherein the priority of wireless resources to or from the UE is indicated by at least one of a slice service type (SST) or a slice differentiator (SD).

6. The at least one non-transitory computer-readable medium of claim 1, wherein the first resource priority identifier is associated with a lower latency wireless resource than wireless resources associated with the second resource priority identifier.

7. The at least one non-transitory computer-readable medium of claim 1, the 5G or later generation wireless network being further caused to:
   receive an indication of an emergency call originating from or terminating to the UE;

allocate the UE with one or more outer resource blocks or inner resource blocks in response to receiving the indication of the emergency call; and, send an indication to the UE to utilize a Discrete Fourier Transform (DFT)-spread Orthogonal Frequency Division Multiplex (OFDM) (DFT-s-OFDM) waveform for UL transmissions.

8. The at least one non-transitory computer-readable medium of claim 1, the 5G or later generation wireless network being further caused to:

receive a power headroom report (PHR) from the UE, wherein the PHR indicates a power headroom available to the UE for uplink (UL) transmissions;

allocate the UE with one or more inner resource blocks when the power headroom is below a first threshold; and, allocate the UE with one or more edge resource blocks when the power headroom is above a second threshold, wherein the first threshold is lower than the second threshold.

9. At least one non-transitory computer-readable storage medium storing instructions, which, when executed by at least one data processor communicating with a wireless telecommunications network, executes operations, comprising:

receiving an indication of an emergency call originating from or terminating to a mobile device;

allocating the mobile device with one or more outer resource blocks or inner resource blocks in response to receiving the indication of the emergency call; and, sending an indication to the mobile device to utilize a Discrete Fourier Transform (DFT)-spread Orthogonal Frequency Division Multiplex (OFDM) (DFT-s-OFDM) waveform for uplink (UL) transmissions with the wireless telecommunications network.

10. The at least one non-transitory computer-readable storage medium of claim 9, further comprising operations to:

receiving a QOS identifier, wherein the QOS identifier is a first QOS identifier associated with buffered streaming video wireless resources, a second QOS identifier associated with voice wireless resources, live streaming video wireless resources, or interactive gaming wireless resources, or a third QOS identifier is associated with default wireless resources.

11. The at least one non-transitory computer-readable storage medium of claim 9, further comprising operations to:

receive a network slice identifier from the mobile device;

determine a priority of a network slice associated with the network slice identifier;

allocate the mobile device with one or more inner resource blocks when the priority of the network slice associated with the network slice identifier is a highest priority among priorities of network slices of other mobile devices in the wireless communications network; and, allocate the mobile device with one or more edge resource blocks when the priority of the network slice associated with the network slice identifier is a lowest priority among the priorities of the network slices of the other mobile devices in the wireless communications network.

12. The at least one non-transitory computer-readable storage medium of claim 9, further comprising operations to:

receive a power headroom report (PHR) from the mobile device, wherein the PHR indicates a power headroom available to the mobile device for uplink (UL) transmissions;

allocate the mobile device with one or more inner resource blocks when the power headroom is below a first threshold; and, allocate the mobile device with one or more edge resource blocks when the power headroom is above a second threshold, wherein the first threshold is lower than the second threshold.

13. A method for use in a wireless telecommunications network, the method comprising:

at a network node in the wireless telecommunications network, determining a priority of resource requests to or from multiple mobile devices,
wherein the priorities of the resource requests are identified in at least two of:
a 5G quality of service (QOS) identifier (5QI),
a 4G QOS class identifier (QCI),
a network slice service type (SST), or
a network slice differentiator (SD) value; and, depending on the priorities of the resource requests associated with the mobile devices, and at the network node, providing inner or outer resource blocks to the mobile devices,
wherein the network node provides inner resource blocks resulting in a lower maximum power reduction (MPR) for higher priority resource requests; and
wherein the network node provides outer resource blocks to lower priority resource requests relative to the higher priority resource requests.

14. The method of claim 13, wherein the network node is an eNB or a gNB.

15. The method of claim 13, wherein the network node provides edge resource blocks to mobile units with lowest priority resource requests; and wherein the outer resource blocks are provided to mobile units with intermediate or default priority resource requests.

16. The method of claim 13, wherein the priorities of the resource requests are identified via a first SST associated with an Ultra-Reliable Low Latency (URLLC) network slice, a second SST is associated with an enhanced Mobile Broad Band (eMBB) network slice, and a third SST is associated with an Internet of Things (IoT) network slice.

17. The method of claim 13 further comprising:

receiving an indication of an emergency call originating from or terminating at a wireless device;

at the network node, providing the wireless device with one or more outer or inner resource blocks in response to receive this indication; and sending a message to the wireless device to utilize a Discrete Fourier Transform (DFT)-spread Orthogonal Frequency Division Multiplex (OFDM) (DFT-s-OFDM) waveform for uplink transmissions.

18. The method of claim 13 further comprising:

receiving a power headroom report (PHR) from the wireless device, wherein the PHR indicates a power headroom available to the mobile device for uplink (UL) transmissions;

allocating the wireless device with one or more inner resource blocks when the power headroom is below a first threshold; and, allocating the wireless device with one or more edge resource blocks when the power headroom is above a second threshold, wherein the first threshold is lower than the second threshold.

* * * * *